US012760589B2

(12) United States Patent
Schadrin

(10) Patent No.: US 12,760,589 B2
(45) Date of Patent: Oct. 13, 2026

(54) MUNTIN BAR INSERT, MUNTIN BAR HOLDER AND SPACER STRIP FOR AN INSULATING GLASS PANE AND METHOD OF MANUFACTURE

(71) Applicant: Glaston Germany GmbH, Neuhausen-Hamberg (DE)

(72) Inventor: Gennadi Schadrin, Remchingen (DE)

(73) Assignee: Glaston Germany GmbH, Neuhausen-Hamberg (DE)

( * ) Notice: Subject to any disclaimer, the term of this patent is extended or adjusted under 35 U.S.C. 154(b) by 392 days.

(21) Appl. No.: 18/353,874

(22) Filed: Jul. 17, 2023

(65) Prior Publication Data

US 2024/0035331 A1 Feb. 1, 2024

(30) Foreign Application Priority Data

Jul. 27, 2022 (DE) ..................... 10 2022 118 884.1

(51) Int. Cl.
*E06B 3/66* (2006.01)
*E06B 3/667* (2006.01)

(52) U.S. Cl.
CPC .................................. *E06B 3/6675* (2013.01)

(58) Field of Classification Search
CPC .. E06B 3/664; E06B 3/66319; E06B 3/66328; E06B 3/6675; E06B 3/663; E06B 3/685; E06B 3/67326
USPC ........................... 52/204.61, 456, 507, 656.8
See application file for complete search history.

(56) References Cited

U.S. PATENT DOCUMENTS

| | | | | | |
|---|---|---|---|---|---|
| 3,099,865 | A * | 8/1963 | Burnett | E06B 3/685 | 52/456 |
| 3,293,817 | A * | 12/1966 | Macgregor | E06B 3/685 | 52/456 |
| 3,358,412 | A * | 12/1967 | Martin | E06B 3/685 | 52/456 |
| 3,381,431 | A * | 5/1968 | Jacobson | E06B 3/685 | D25/60 |
| 3,708,939 | A * | 1/1973 | Herr | E06B 3/685 | 52/456 |
| 4,838,001 | A * | 6/1989 | Battles | E06B 3/685 | 52/456 |
| 5,226,919 | A * | 7/1993 | Milligan | E06B 3/685 | 52/656.8 |

(Continued)

FOREIGN PATENT DOCUMENTS

| | | | |
|---|---|---|---|
| CH | 568467 A5 * | 10/1975 | E06B 3/685 |
| DE | 29 514 622 U1 | 1/1996 | |

(Continued)

OTHER PUBLICATIONS

Machine Translation of DE-102004043581-A1 (Year: 2006).*

*Primary Examiner* — Ryan D Kwiecinski
(74) *Attorney, Agent, or Firm* — Orbit IP, LLP; Marc G. Martino

(57) ABSTRACT

An insulating glass pane includes at least two glass plates, a frame-shaped spacer made of a synthetic-based material and a muntin bar insert attached to the spacer. The spacer and the muntin bar insert are located between the two glass plates. The insulating glass pane contains at least one pair of magnets being two magnets which cooperate to position and hold the muntin bar insert in the insulating glass pane.

6 Claims, 4 Drawing Sheets

(56) References Cited

U.S. PATENT DOCUMENTS

| | | | | | |
|---|---|---|---|---|---|
| 5,437,133 | A * | 8/1995 | Pliml | E06B 3/685 52/456 |
| 5,961,759 | A | 10/1999 | Schubert | |
| 6,230,456 | B1 * | 5/2001 | Merchlewitz | E06B 3/685 411/908 |
| 2004/0139592 | A1 | 7/2004 | McGlinchy | |
| 2006/0076110 | A1 | 4/2006 | Lisec | |
| 2007/0000195 | A1 * | 1/2007 | Garces | B44C 5/00 52/311.3 |
| 2010/0236167 | A1 * | 9/2010 | Parker | E06B 3/6604 52/204.61 |
| 2019/0316408 | A1 * | 10/2019 | Napier | E06B 3/685 |
| 2020/0318423 | A1 * | 10/2020 | Napier | E06B 3/6675 |

FOREIGN PATENT DOCUMENTS

| | | | | |
|---|---|---|---|---|
| DE | 44 33 749 | A1 | 3/1996 | |
| DE | 101 63 844 | C1 | 10/2003 | |
| DE | 102 12 359 | A1 | 10/2003 | |
| DE | 202004014038 | U1 * | 2/2005 | E06B 3/667 |
| DE | 102004043581 | A1 * | 3/2006 | E06B 3/6675 |
| DE | 602 05 958 | T2 | 7/2006 | |
| JP | 2006336295 | A * | 12/2006 | |

* cited by examiner

MUNTIN BAR INSERT, MUNTIN BAR HOLDER AND SPACER STRIP FOR AN INSULATING GLASS PANE AND METHOD OF MANUFACTURE

CROSS-REFERENCE TO RELATED APPLICATIONS

This application claims priority to the German application number 10 2022 118 884.1 filed on Jul. 27, 2022, the entire content of which is fully incorporated herein with this reference.

DESCRIPTION

Field of the Invention

The invention relates to an insulating glass pane comprising at least two glass plates, a frame-shaped spacer made of a synthetic-based material and a muntin bar insert attached to the spacer, wherein the spacer and the muntin bar insert are located between the two glass plates.

Background of the Invention

Such an insulating glass pane is known from DE 10 2004 043 581 A1. The insulating glass pane has a frame-shaped spacer which is made of thermoplastic material and is arranged between two glass plates. The known muntin bar can be a metallic hollow profile bar. Furthermore, a muntin bar holder is disclosed, which is designed as a muntin bar end piece and has means for anchoring to the spacer. At least one muntin bar holder per muntin bar is designed in such a way that the muntin bar can be inserted into the holder with its end transverse to its longitudinal direction. Even if the muntin bar holders contact the surface of the glass plate when the muntin bar is inserted, the still formable spacer may be deformed in an undesirable way due to the forces that occur.

An insulating glass pane of the type mentioned above with a thermoplastic spacer is also known from DE 295 14 622 U1. A muntin bar insert arranged between the glass plates has muntin bars which are thinner than the predetermined distance between the two glass plates. The muntin bars have end pieces that rest against the glass plates and are glued to at least one of the glass plates.

DE 602 05 958 T2 discloses a semi-finished material for muntin bars, which is manufactured by roller forming of decoratively coated layer material or sheet metal, for example steel. It is known from DE 101 63 844 C1 that zinc coated sheet metal is an appropriate material for muntin bar end pieces of a muntin grid. Non-generic US 2019/0316408 A1 discloses a retrofit window kit, including magnetic sash elements configured to be positioned at one or more locations on an interior perimeter of the sash. The retrofit window kit further includes a removable muntin grid, which muntin bars each have a muntin bar end piece comprising a magnetic element for magnetically coupling the muntin grid to the magnetic sash elements and for decoupling it from the sash again.

SUMMARY OF THE INVENTION

The invention is based on the object of improving the quality of insulating glass panes with inserted muntin bar insert and of further reducing the risk of the spacer being undesirably deformed or injured when the muntin bar insert is put in place.

This object is achieved by an insulating glass pane, a muntin bar insert, a muntin bar holder, a method, and by a spacer strip with the features given in the claims. Advantageous further developments of the invention are the subject of the dependent patent claims.

The insulating glass pane according to the invention comprises at least two glass plates and a frame-shaped spacer made of a synthetic-based material. A muntin bar insert is attached to the spacer. The spacer and the muntin bar insert are arranged between the two glass plates. The insulating glass plate includes at least one pair of magnets comprising two magnets. The two magnets act together to position and hold the muntin bar insert in the insulating glass pane. In particular, the two magnets of the pair of magnets are in contact with each other. One of the magnets of the magnet pair can be inserted into the spacer. The other magnet of the magnet pair can be arranged in the muntin bar insert. In an embodiment, the magnet can be fastened to the muntin bar insert.

One of the magnets of the magnet pair can be a hard magnet. The other magnet of the magnet pair can be a soft magnet. A hard magnet consists of a hard magnetic material and can also be called a permanent magnet. A soft magnet consists of a soft magnetic material, for example ferromagnetic steel or iron.

The muntin bar insert for an insulating glass pane according to the invention has at least one muntin bar with two ends configured to be attached to the spacer. A magnet is arranged at least at one of the ends of the muntin bar configured to be attached to the spacer, namely in a manner movable along the longitudinal direction of the muntin bar. The muntin bar insert consists of at least one muntin bar. However, the muntin bar insert may also comprise an arrangement of several intersecting muntin bars. Such an arrangement is sometimes referred to as a "muntin grid". The muntin bars can be thin-walled hollow profile bars, in the end of which a muntin bar end piece is inserted, which is configured to be attached to the spacer.

The muntin bar holder according to the invention for fastening the muntin bar insert to the spacer of the insulating glass pane contains at least one magnet. The muntin bar holder is configured to hold the magnet on the muntin bar insert or on the spacer. The muntin bar holder may be formed integrally with the magnet, in particular from soft magnetic material. The muntin bar holder may consist of a single part if it is formed as a magnet. A one-piece muntin bar holder may be configured to be inserted into the spacer. Alternatively, the muntin bar holder may comprise multiple parts. The muntin bar holder may comprise said at least one magnet and a magnet holder, in particular made of synthetic material. The magnet, in particular the hard magnet, is movably arranged in the muntin bar holder, namely in a manner movable along the longitudinal direction of the muntin bar. The muntin bar holder may be formed as a muntin bar end piece. The muntin bar end piece can be insertable into one end of a hollow muntin bar. A muntin bar holder designed as a muntin bar end piece can in particular contain a magnet made of a hard magnetic material.

In the method according to the invention for producing an insulating glass pane with a muntin bar insert held by magnetic force, the spacer made of a synthetic-based material is applied in the form of a frame to a first of the glass plates. The spacer runs along the edges of the glass plate. At least one magnet is inserted into the spacer. This can be done before or after the spacer is applied to the first glass plate. The magnet may be contained in a muntin bar holder which is inserted into the spacer. The muntin bar insert is then attached to the frame-shaped spacer, which is located on the first glass plate and is provided with at least one magnet. One magnet in the muntin bar insert and one magnet in the spacer act together to form a pair of magnets that hold the muntin bar insert in position. After the muntin bar insert has been put in place, the frame-shaped spacer is joined to a second of the glass plates so that the spacer and the muntin bar insert are located between the first and second glass plates. In a manner known per se, further process steps, such as gas filling, can be carried out in between or after this.

For example, a plastic strand can be used as a spacer, which is applied to the first glass sheet with a predetermined target thickness. In particular, the strand can consist of a thermoplastic synthetic material. A method and a device for applying a plastic strand as a spacer are known from DE 44 33 749 A1. After the plastic strand has been applied to the first glass plate, said at least one magnet or the muntin bar holder is inserted into the strand. The strand can still be plastically deformable in said process.

Alternatively, a strip prefabricated from synthetic material to be processed from the roll can be used as a spacer, which is known for example from DE 102 12 359 A1. The spacer strip has a rectangular cross-section with two wide sides and two narrow sides. Each of the narrow sides is configured to be placed on one of the glass plates. In this alternative, said at least one magnet or the muntin bar holder can first be inserted into one of the wide sides of the spacer strip. The spacer strip provided with at least one magnet is then applied to the first glass plate.

The invention may have significant advantages:

The attachment of a muntin bar insert to a spacer made from a synthetic-based material, in particular from a still deformable strand, can be carried out more easily and better. In particular, this significantly simplifies the assembly process during the manufacture of the insulating glass pane.

When the muntin bar insert is placed against the frame-shaped spacer, essentially only the magnetic forces act on the spacer. These are very low. This minimizes the risk of the spacer deforming in an undesirable way or being damaged during attachment.

Nevertheless, the holding forces from the magnets are sufficient to hold the muntin bar insert securely in position. Once the insulating glass pane is fully assembled, the muntin bar insert is held precisely and securely inside the insulating glass pane.

The magnetic attachment of the muntin bar insert to the spacer enables the muntin bar insert to be positioned between the two glass plates in such a way that the muntin bar insert does not touch either of the two glass plates. This is particularly advantageous if the glass plates have a coating on their inward-facing surface. The muntin bar holders or magnets also do not touch the glass plates.

The insertion of the muntin bar holders into the spacer can be easily automated. This ensures very precise positioning of the muntin bar insert in the frame-shaped spacer or in the insulating glass pane.

Overall, the appearance and quality of insulating glass panes with inserted muntin bars can be improved.

In an embodiment of the invention, the spacer strip may include a plurality of magnets inserted at predetermined intervals along the longitudinal direction of the spacer strip. This can be advantageous for the rational production of insulating glass panes in standard formats.

In a further embodiment of the invention, one of the magnets of the magnet pair or the muntin bar holder containing the magnet may be inserted in the spacer. The other magnet of the pair of magnets or the muntin bar holder containing the magnet may be located in the muntin bar insert, in particular movably in one of its ends. In particular, the hard magnet may be arranged in the muntin bar insert and the soft magnet may be arranged in the spacer. In particular, at least one magnet is arranged at each end of the muntin bar. A muntin bar holder may contain two or more magnets to provide a higher holding force for the muntin bar insert.

Said at least one magnet can be arranged in a movable manner in the magnet holder, namely movable along the longitudinal direction of the muntin bar. In an embodiment, said at least one magnet can be movably fastened to the muntin bar holder. A linear guide for the magnet can be provided for movably guiding said magnet along the longitudinal direction of the muntin bar. The muntin bar insert and/or the magnet holder can include the linear guide. The magnet may have a cylindrical section with which it is seated in the linear guide and is displaceable relative to the magnet holder and/or the muntin bar insert. The magnet can have a recess for contacting the other magnet of the magnet pair in the insulating glass pane. This creates a form fit between the magnets which increases the holding forces of the magnet pair. An additional magnet can be fixed in the muntin bar holder. The additional magnet is fixed immovably in the magnet holder.

In a further embodiment, the muntin bar holder can have at least one projection. With the help of the projection, the muntin bar holder can be inserted into the muntin bar insert or into the spacer. The projection may be integrally formed with the magnet or the magnet holder. The projection is configured to hold the muntin bar holder in the muntin bar insert or in the spacer. For this purpose, the projection may have a tip for piercing into the spacer. The projection can be designed as a pointed spike. The projection may contain sharp-edged protrusions and/or barbs for holding the magnet in the spacer and/or the muntin bar.

BRIEF DESCRIPTION OF THE DRAWINGS

Further details and advantages of the invention are explained by means of examples of embodiments of the invention with reference to the accompanying drawings. Identical and corresponding components are indicated therein with matching reference numbers.

DETAILED DESCRIPTION OF EMBODIMENTS OF THE INVENTION

Figure 1:
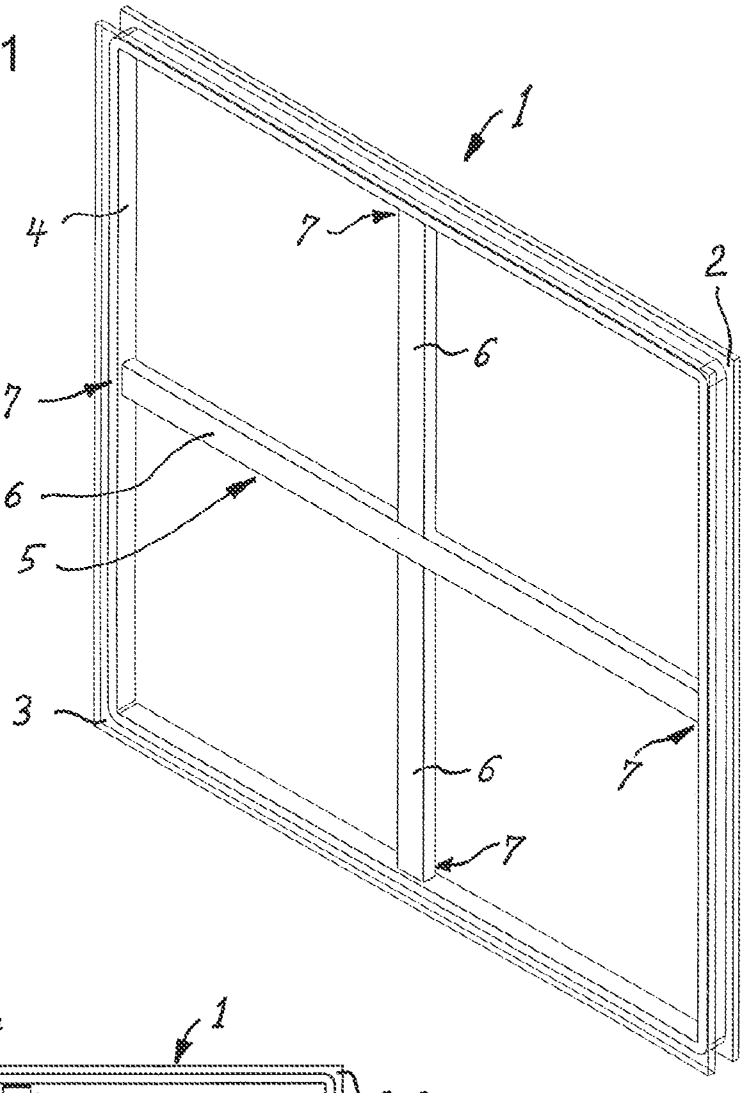
FIG. 1 shows a perspective view of an insulating glass pane according to the invention.
Figure 2:
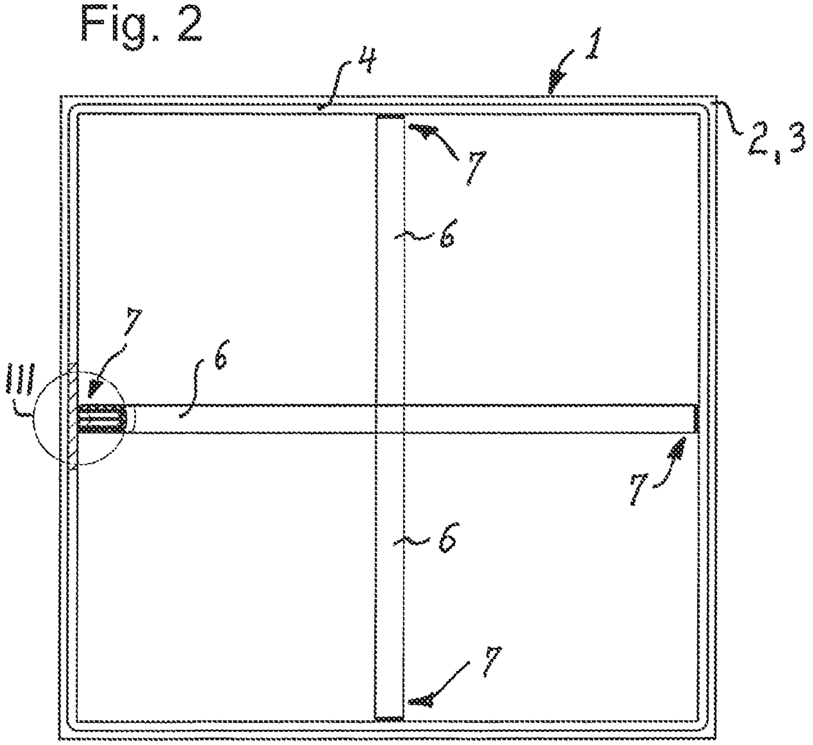
FIG. 2 shows a front view of the insulating glass pane of FIG. 1.
Figure 3:
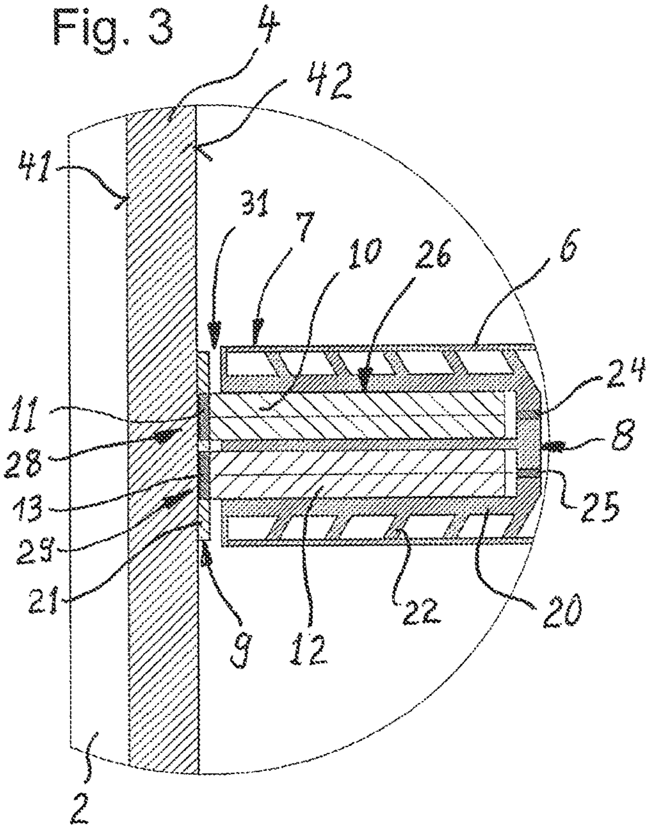
FIG. 3 shows an enlarged representation of area III of FIG. 2.
Figure 4:
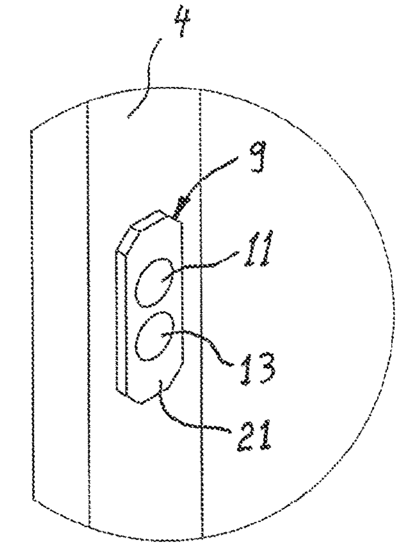
FIG. 4 shows a perspective view of the area shown in FIG. 3 without muntin bar insert.
Figure 5:
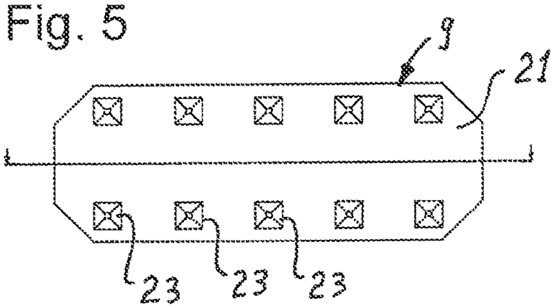
FIG. 5 shows a top view of a muntin bar holder according to the invention for insertion into a spacer.

FIGS. 1 and 2 show an insulating glass pane 1 according to the invention, comprising a first glass plate 2, a second glass plate 3, a frame-shaped spacer 4 and a muntin bar insert 5. The muntin bar insert 5 contains a plurality of muntin bars 6. The muntin bars 6 have ends 7 which are configured to be attached to the spacer 4. The spacer 4 is made of a synthetic material and is applied to the first glass plate 2 along the edges in the shape of a frame. As a spacer, a plastic strand of a pasty mass with a predetermined nominal thickness can be applied onto the first glass plate 2 in a manner known per se. Alternatively, a spacer strip can be used as spacer 4 in a manner known per se.

The muntin bar insert 5 is positioned and held in the frame-shaped spacer 4 by means of muntin bar holders 8 and 9, cf. FIGS. 3 to 8. The muntin bar holder 8 is inserted into the end 7 of the hollow muntin bar 6. The muntin bar holder 9 is inserted into the spacer 4. The muntin bar holder 8 contains two magnets 10 and 12 and a magnet holder 20. The muntin bar holder 9 contains two magnets 11 and 13 and a magnet holder 21. The magnets 10 and 11 attract each other and form a pair of magnets 28 which holds the muntin bar insert 5 to the spacer 4. The magnets 12 and 13 also attract each other and form a further pair of magnets 29. For fixing purposes, the magnet holder 20 has several projections 22 which are designed as barbs to make it more difficult to pull the muntin bar holder 8 out of the muntin bar 6. The muntin bar holder 8 thus forms an end piece of the muntin bar 6. The magnet holder 21 has projections 23 which are pressed into the spacer 4. The projections 23 are pointed and/or sharp-edged in order to anchor the muntin bar holder 8 in the still plastic strand of the spacer 4.

The muntin bar holder 8 contains additional magnets 24 and 25 which are fixed in the magnet holder 20. The additional magnet 24 is associated with the magnet 10 and the additional magnet 25 with the magnet 12. The magnet holder 20 also contains linear guides 26. The linear guides 26 run in the longitudinal direction of the muntin bar 6. Each of the magnets 10, 12 is mounted with a cylindrical section in the respective linear guide 26 so as to be displaceable relative to the magnet holder 20. The magnets 10 and 12 are hard magnets. The magnets 11 and 13 and the additional magnets 24 and 25 are soft magnets. Before the muntin bar holder 8 is installed in the end 7, the magnets 10 and 12 are fully seated in the magnet holder 20 and are in contact with the additional magnets 24, 25, cf. FIG. 7. The additional magnets 24, 25 prevent the magnets 10, 12 from unintentionally falling out of the linear guides 26 when the muntin bar insert 5 is installed.

After applying the frame-shaped spacer 4 to the first glass plate 2, a muntin bar holder 9 is inserted into the spacer 4 at the corresponding position for each end 7. If necessary, counter-pressure can be applied to prevent unintentional displacement of the spacer 4. Then the prepared muntin bar insert 5, which contains a bar holder 8 at each end 7, is attached to the spacer 4. When the muntin bar insert 5 is placed on the spacer 4, the magnet 10 is attracted by the magnet 11. If, due to dimensional tolerances, there is a small gap 31 between the two muntin bar holders 8 and 9, the magnet 10 is pulled a little way out of the linear guide 26 until it is in contact with the magnet 11, cf. FIG. 3. To ensure this, a greater attractive force acts between the magnets 10 and 11 than between the magnets 10 and 24. To this end, the additional magnet 24 can have a much smaller cross-section than the magnets 10 and 11. The magnet cross-section is determined in a section perpendicular to the linear guide 26. The cross-section of the additional magnet 24 may be less than a quarter of the cross-section of the magnet 10. The same applies in relation to magnets 12, 13 and the corresponding additional magnet 25. By means of the pairs of magnets 28, 29 at each end 7, the muntin bar insert 5 is held securely and precisely between the glass plates and 2 and 3. In a manner known per se, a sealing compound can then be applied to the area outside the spacer 4 between the two glass plates 2 and 3.

Figure 14:
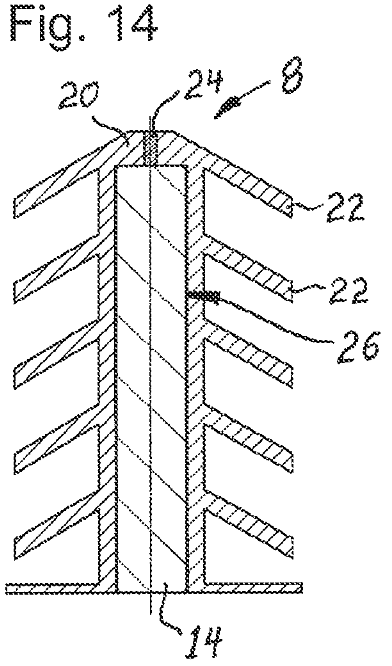
FIG. 14 shows a view similar to FIG. 7 of a variant of a muntin bar holder for insertion into a muntin bar insert.
Figure 15:
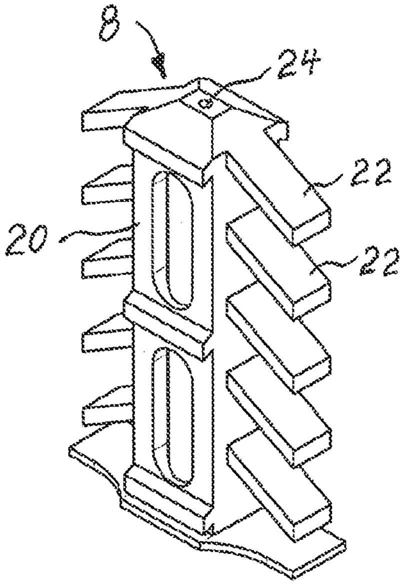
FIG. 15 shows a perspective view of the muntin bar holder of FIG. 14.
Figure 9:
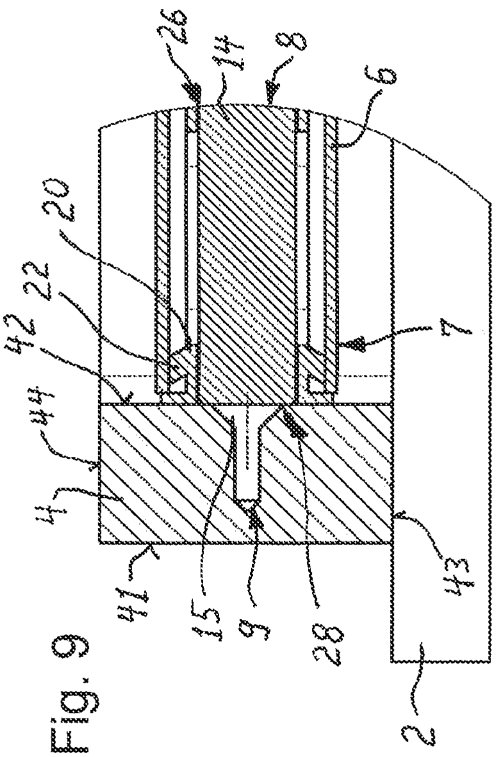
FIG. 9 shows an enlarged and sectional view of a section of a variant of an insulating glass pane according to the invention.

FIG. 9 shows an intermediate state in the manufacture of the insulating glass pane 1, which is prepared for the second glass plate 3 to be placed on the spacer 4. The spacer 4 has been applied to the first glass plate 2 in the shape of a frame. The muntin bar holder 9 is integrally formed with the magnet 15 from a soft magnetic material. The magnet 15 contains a projection or extension 23 in the form of a pointed spike 33, cf. top left in FIG. 10, with which the muntin bar holder 9 has been pierced into the spacer 4. The muntin bar holder 8 is inserted into the end 7 of the hollow muntin bar 6 and contains only one magnet 14, cf. FIGS. 14 and 15, and is otherwise similar in design to the muntin bar holder of FIGS. 7 and 8 described above. The muntin bar insert 5 was then placed against the spacer 4 so that the magnet 14 interacts with the magnet 15 to form the magnet pair 28. In the illustration of FIG. 9 it can be seen that the spacer 4 has a rectangular cross-section with two opposite wide sides 41 and 42 and two opposite narrow sides 43 and 44. If the spacer 4 is designed as a spacer strip, the narrow sides 43, 44 are each configured to be placed on the respective glass plate 2, 3. For this purpose, the narrow sides 43, 44 may have grooves and/or steps in a manner not shown but known per se for receiving adhesive which bonds the spacer 4 to the glass plates 2, 3. The magnet 15 is inserted into the spacer 4 from the wide side 42 facing the inside of the insulating glass pane 1. The opposite wide side 41 remains intact. This can be advantageous if the spacer strip is provided with a film impermeable to water vapor on its wide side 41 in a manner known per se.

Figure 10:
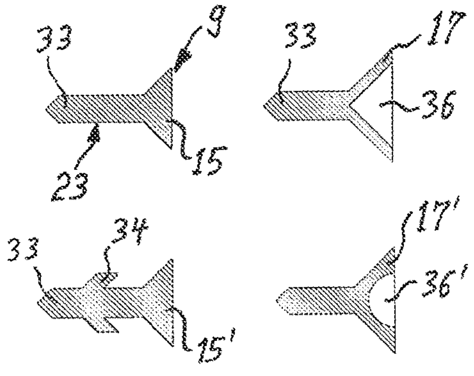
FIG. 10 shows four variants of muntin bar holders according to the invention for insertion into a spacer.
Figure 6:
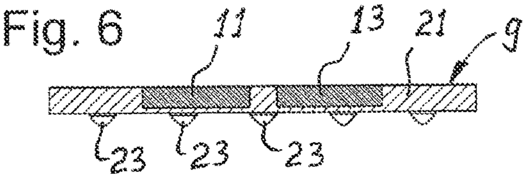
FIG. 6 shows a sectional view of the muntin bar holder of FIG. 5.
Figure 7:
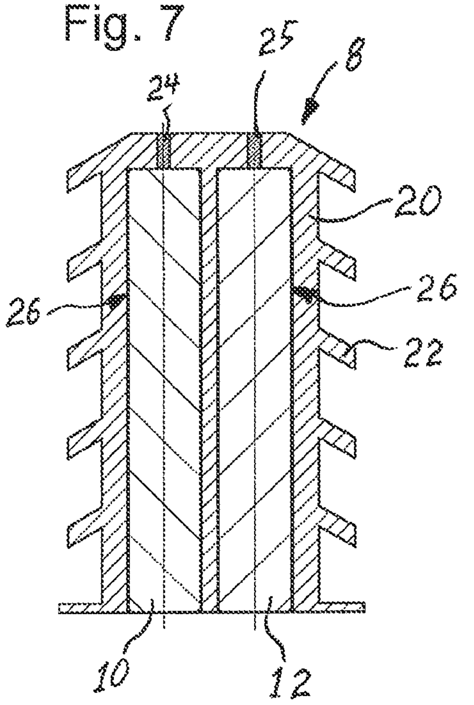
FIG. 7 shows a sectional view of a muntin bar holder according to the invention for insertion into a muntin bar insert.
Figure 8:
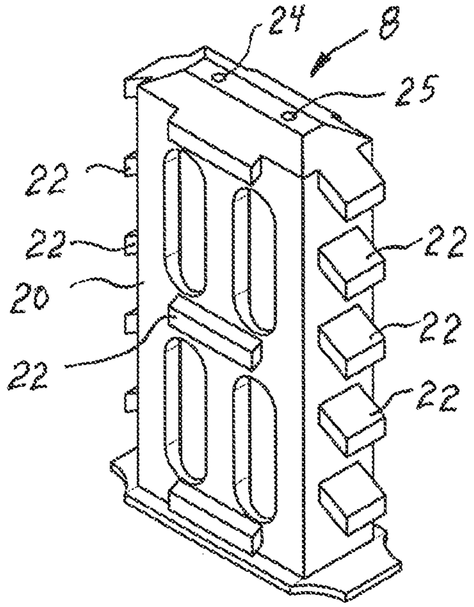
FIG. 8 shows a perspective view of the muntin bar holder of FIG. 7.
Figure 12:
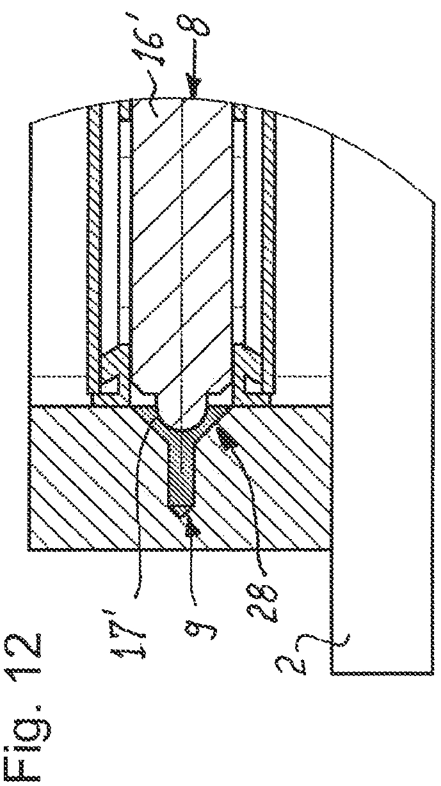
FIG. 12 shows a view similar to FIG. 9 of a further variant of the invention.
Figure 11:
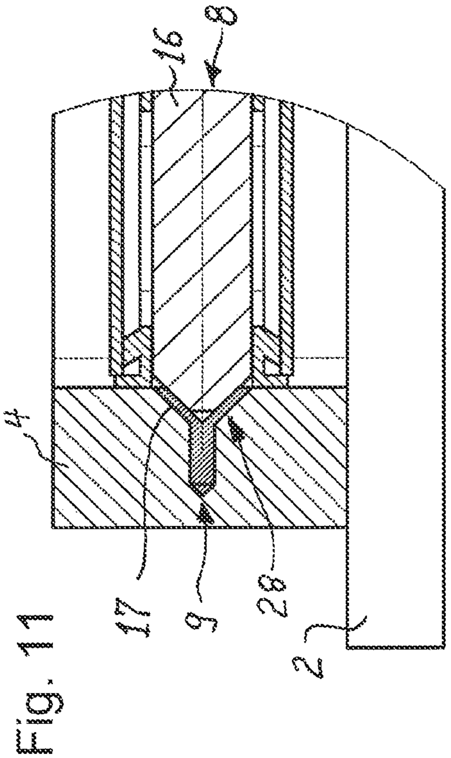
FIG. 11 shows a view similar to FIG. 9 of a further variant of the invention.

As a variant to improve the fastening, the magnet 15' can be provided with barbs 34 on its spike 33, cf. bottom left in FIG. 10. In another variant, the magnet 17 contains a recess 36, which is cone-shaped, cf. top right in FIG. 10 and FIG. 11. The end of the magnet 16 facing the magnet 17 is shaped to match the recess 36 and contains a cone for this purpose. This improves the positioning of the muntin bar insert 5 and increases the holding force of the pair of magnets 28 consisting of magnets 16 and 17. In the variant shown at the bottom right in FIG. 10 and in FIG. 12, the recess 36' in the magnet 17' and the associated end of the magnet 16' are spherical. Otherwise, the embodiments in FIGS. 11 and 12 are designed in the same way as the embodiment in FIG. 9.

Figure 13:
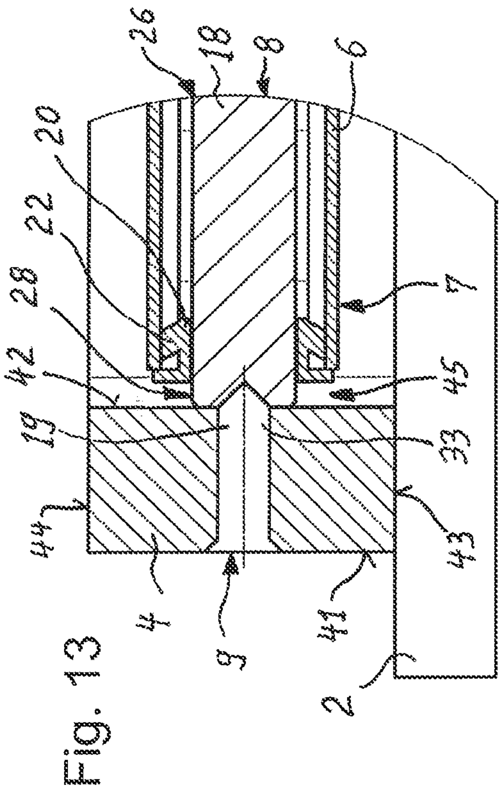
FIG. 13 shows a view similar to FIG. 9 of a further variant of the invention.

In the embodiment of the invention shown in FIG. 13, the muntin bar holder 9 is also formed integrally with the magnet 19, but is inserted into the spacer 4 from the wide side 41 facing outwards. This can be advantageous if the spacer 4 has been applied to the glass plate 2 as a plastic strand and then the magnet 18 is inserted into the still plastic strand. More space is available on the outside of the spacer 4 for a device for inserting the magnet 19. The pointed spike 33 is pierced through the spacer 4 and protrudes from the spacer 4 on the wide side 42 facing inwards. A corresponding distance 45 of the end 7 from the spacer 4 is therefore required for inserting the muntin bar insert 5. In this embodiment example, the magnet 18 is also mounted in the muntin bar holder 8 by means of a linear guide 26. In a manner not shown, an additional magnet 24 can also be provided here. The magnet pair 28 consisting of the magnets 18 and 19 thus holds the muntin bar insert 5 in position with a positive fit.

LIST OF REFERENCE SIGNS

1 Insulating glass pane
2 Glass plate
3 Glass plate
4 Spacer
5 Muntin bar insert
6 Muntin bar
7 End
8 Muntin bar holder
9 Muntin bar holder
10 Magnet
11 Magnet
12 Magnet
13 Magnet
14 Magnet
15 Magnet
16 Magnet
17 Magnet
18 Magnet
19 Magnet
20 Magnet holder
21 Magnet holder
22 Projection
23 Projection
24 Additional magnet
25 Additional magnet
26 Linear guide
28 Pair of magnets
29 Pair of magnets
31 Gap
33 Spike
34 Barbs
36 Recess
41 Wide side
42 Wide side
43 Narrow side
44 Narrow side
45 Distance

What is claimed is:

1. An insulating glass pane comprising:

at least two glass plates;

a frame-shaped spacer made of a synthetic-based material and a muntin bar insert attached to the spacer, the spacer and the muntin bar insert being located between the two glass plates;

wherein the insulating glass pane comprises at least one pair of magnets containing two magnets which cooperate to position and hold the muntin bar insert in the insulating glass pane;

wherein the muntin bar insert comprises at least one muntin bar and a linear guide for one magnet of the magnet pair, wherein the other magnet of the magnet pair is inserted into the spacer, and wherein the linear guide is configured for movably guiding said magnet along a longitudinal direction of the at least one muntin bar when being attracted by the other magnet of the magnet pair.

2. The insulating glass pane according to claim 1, in which one of the magnets of the magnet pair is a hard magnet and the other magnet of the magnet pair is a soft magnet.

3. The insulating glass pane according to claim 1, wherein one of the magnets of the pair of magnets is attached to the spacer and the other magnet of the pair of magnets is arranged in the muntin bar insert or fastened to the muntin bar insert.

4. A method for producing an insulating glass pane comprising at least two glass plates held at a distance by a spacer, having the following steps:

the spacer made of a synthetic-based material is applied in the form of a frame onto a first of the glass plates;

at least one magnet is inserted into the spacer before or after the spacer is applied to the first glass plate;

a muntin bar insert containing at least one magnet is placed on the frame-shaped spacer wherein in each case a magnet in the muntin bar insert cooperates with a magnet in the spacer and forms a pair of magnets which holds the muntin bar insert in position;

after the muntin bar insert has been put in place, the frame-shaped spacer is joined to a second of the glass plates wherein the spacer and the muntin bar insert are located between the first and second glass plates;

wherein the muntin bar insert contains at least one muntin bar, wherein the magnet in the muntin bar insert is arranged in the at least one muntin bar in a manner being movable along a longitudinal direction of the at least one muntin bar, wherein the magnet in the muntin bar insert is pulled a little way out of the at least one muntin bar when being attracted by the magnet in the spacer.

5. The method according to claim 4, wherein a plastic strand is applied as a spacer onto the first glass sheet and then said at least one magnet is inserted into the strand.

6. The method according to claim 4, wherein a spacer strip is used as a spacer, wherein said at least one magnet is first inserted into the spacer strip and subsequently the spacer strip is applied to the first glass plate.

* * * * *